United States Patent Office 3,450,789
Patented June 17, 1969

3,450,789
DEHYDROGENATION PROCESS
William L. Kehl, Raymond J. Rennard, Jr., and Michael R. Basila, Pittsburgh, Pa., assignors to Goodrich-Gulf Chemicals, Incorporated, Cleveland, Ohio, a corporation of Delaware
No Drawing. Filed May 21, 1968, Ser. No. 730,956
Int. Cl. C07c 5/18
U.S. Cl. 260—680                22 Claims

ABSTRACT OF THE DISCLOSURE

Process for the oxidative dehydrogenation of hydrocarbons which comprises contacting a mixture of a hydrocarbon and oxygen with a lanthanum chromium ferrite catalyst at a temperature above about 250° C., thereby producing a dehydrogenated hydrocarbon having the same number of carbon atoms as said hydrocarbon.

BACKGROUND OF THE INVENTION

Field of the invention

This invention relates to a process for dehydrogenating hydrocarbons. More particularly, this invention relates to the oxidative dehydrogenation of hydrocarbons in the presence of oxygen and a catalyst.

DESCRIPTION OF THE PRIOR ART

Oxidative dehydrogenation processes have been employed to convert saturated and/or unsaturated hydrocarbons to more highly unsaturated hydrocarbons through removal of hydrogen from such hydrocarbons by combination with oxygen to form water and the unsaturated product in the presence of a catalyst. Catalyst systems have heretofore been proposed to increase the selectivity of the process to produce the desired product and the conversion per pass of the feed stream thereby maximizing the yield per pass of the desired product. Many of these catalysts, however, have necessitated the use of relatively high reaction temperatures, e.g., above 600° C., and/or low pressures, generally between about 5 and 25 p.s.i.a. Recently, catalysts of the ferrite family have been proposed for use in oxidative dehydrogenation processes. These catalysts, however, are prepared at relatively high temperatures, i.e. about 850° C. to 1,300° C., and have been found to be stable for only relatively short periods of time at reaction conditions.

Accordingly, it is an object of the present invention to provide a catalyst system which when employed in oxidative dehydrogenation processes effects high conversion and selectivity to the desired product.

It is another object of the present invention to provide a more stable and hence longer lived catalyst system than heretofore employed in oxidative dehydrogenation processes.

It is still another object of the present invention to provide an oxidative dehydrogenation process employing relatively low reaction temperatures and being essentially free of pressure limitations.

SUMMARY OF THE INVENTION

In accordance with the present invention, a process is provided for the oxidative dehydrogenation of hydrocarbons comprising contacting a mixture of a hydrocarbon containing at least about 4 carbon atoms and oxygen with a lanthanum chromium ferrite catalyst having the empirical formula $La_aCr_bFe_cO_3$ wherein $a$ ranges from about 0.3 to about 1.25, $b$ ranges from about 0.1 to about 1 and $c$ ranges from about 0.1 to about 1.25, with $a+b+c=2$, at a temperature above about 250° C. thereby producing a dehydrogenated hydrocarbon having the same number of carbon atoms as said initial hydrocarbon.

DESCRIPTION OF THE INVENTION

The catalysts useful in the present invention are lanthanum chromium ferrites containing, as the active components thereof, lanthanum, chromium and iron cations in a single phase perovskite compound. The catalyst can be employed in the form of the homogeneous lanthanum chromium ferrite, per se, or as a heterogeneous composition containing a mixture of the oxides of said cations and the single phase perovskite compound.

The catalyst can be represented by the empirical formula $La_aCr_bFe_cO_3$ wherein $a$ can vary within the range of about 0.3 to about 1.25, $b$ can vary from about 0.1 to about 1 and $c$ can vary from about 0.1 to about 1.25. At the extremes of the ranges set forth herein, the homogeneity of the perovskite compound is not preserved and a mixture of the perovskite compound with oxides of the respective cations is obtained. Although the heterogeneous mixtures of the oxides and the perovskite compounds are active catalysts for oxidative dehydrogenation of hydrocarbons, it is considered preferable to employ substantially homogeneous perovskite compounds. Substantially homogeneous perovskite compounds can be obtained within the composition range wherein $a$ can vary from about 0.7 to about 1, $b$ can vary from about 0.1 to about 1 and $c$ can vary from about 0.1 to about 1, with $a+b+c=2$. It is considered preferable, however, that the perovskite compounds have compositions wherein $a$ can range from about 0.7 to about 1, $b$ can range from about 0.5 to about 0.75 and $c$ can range from about 0.45 to about 0.75, with $a+b+c=2$. Optimumly, the catalyst is a single phase perovskite compound having the empirical formula $La_{0.8}Cr_{0.65}Fe_{0.55}O_3$.

The lanthanum chromium ferrite catalysts of the present invention can be identified by their characteristic X-ray diffraction patterns which consists of lines with the following "$d$" spacings and relative intensities:

| $d$ (A°): | $I/I°$ |
|---|---|
| 3.93 | 25 |
| 2.78 | 100 |
| 2.27 | 20 |
| 1.965 | 30 |
| 1.76 | 10 |
| 1.60 | 30 |
| 1.39 | 12 |

This pattern corresponds to a cubic unit cell. The relative intensities and the "$d$" values will vary with changes in the relatives concentrations of the cations in the structure. Inhomogeneity in the catalyst composition is manifested by additional or doubled lines in the pattern. With some compositions, the cubic structure can become sufficiently distorted to cause other lines to appear, corresponding to a lattice structure with a symmetry lower than that of the cubic lattice.

The lanthanum chromium ferrites can be conveniently prepared by employing as starting materials salts of lanthanum, chromium and iron, in which salts the metals are contained as cations. Any such salt of said metals is satisfactory, however, it is preferred to employ inorganic salts of the metals, such as, for example, nitrates, carbonates, acetates and halides. These salts containing the metals as cations are then admixed with a basic reactant in order to precipitate the precursor of the final product. It is necessary to maintain this addition mixture at a high pH—above about 8, and preferably above about 9. It is considered preferable to vigorously stir the metal salts in order to reduce any pH gradients through said addition mixture.

In order to prevent the inclusion in the precursor, and thus in the final product, of any contaminant it is essential that either a volatilizable base or a base containing no deleterious contaminants such as, for example, sodium, be employed. Any base which can be vaporized readily under the conditions used for drying and calcining can be employed, such as, for example, ammonium carbonate, ammonium bicarbonate and ammonium hydroxide. It is considered preferable, however, to employ an aqueous ammonia solution as the volatilizable base.

After precipitation, advantageously the precursor is washed, again at a pH above about 8, and preferably above about 9, and then dried and calcined. This drying and calcining can effectively be accomplished by any of the techniques well known in the art. Generally, drying can be accomplished at temperatures from about 100° C. to about 150° C. for a period of from about 4 to about 60 hours while calcining can be effected at temperatures ranging from about 350° C. to about 800° C. for a period of from about 2 to 16 hours.

It has been found that both lanthanum and iron hydroxides can be precipitated substantially completely from an aqueous solution of their respective nitrates at a pH of 11.0 to 11.8 employing ammonium hydroxide as the precipitating agent, but both have been found to remain partially in solution at pH less than or equal to 10. Chromium, however, is precipitated most completely from a solution of the nitrate at pH 9.0 to 9.5. Accordingly, a convenient method for the preparation of lanthanum chromium ferrites comprises co-precipitating the lanthanum and iron hydroxides in ammonium hydroxide at a pH of about 11.5 in one reaction vessel, and precipitating the chromium separately in ammonium hydroxide at a pH of about 9.0 to 9.5 in a second reaction vessel. After both precipitates have been washed several times by decantation, they are combined, mixed thoroughly, preferably with heating at about 90° C., for several hours. Thereafter, the resulting mixture of the combined precipitates is recovered by filtration, dried at about 120° C. and calcined for 16 hours at about 650° C. to form the lanthanum chromium ferrite catalyst.

The catalyst can be employed with or without a filler or carrier material and can be pelletized or formed employing conventional techniques. Suitable carrier materials are, for example, rough granular aluminas, zirconias, granular silicon carbide and other similar inert materials. Supported catalysts can be prepared by thoroughly mixing the granular particles of the carrier material with a thick wet slurry of the washed mixture of combined precipitates prior to drying and calcining. The slurried mixture can thereafter be dried at about 120° C. and calcined at about 650° C. to provide granular particles of the supported catalyst.

The process of the present invention is useful in the dehydrogenation of hydrocarbons containing at least 4 carbon atoms. Preferably, aliphatic and aromatic hydrocarbons are employed such as, for example, monoolefins, cycloaliphatic hydrocarbons, aromatic hydrocarbons and mixtures thereof. Exemplary of such hydrocarbons are butene-1, cis-butene-2, trans-butene-2, 2-methyl butene-3, 2-methyl butene-1, 2-methyl butene-2, cyclohexene, 2-methyl pentene-1, 2-methyl pentene-2, normal amylenes, other isoamylenes, and the like and mixtures thereof. For example, the process of the present invention is useful in converting butenes to butadiene-1,3. Still further, the process can be employed to convert normal amylenes to piperylene or isoamylenes to isoprene. Thus, it can be seen that the process of the present invention is, in general, useful in converting unsaturated hydrocarbons to hydrocarbons of greater unsaturation.

The feed streams can be mixed hydrocarbon streams such as refinery streams or effluents from thermal or catalytic cracking processes. These and other refinery by-products streams which contain normal hydrocarbons and/or ethylenically unsaturated hydrocarbons are useful feed stocks.

It has been found, for example, that a mixed feed stream containing butene and butane can result in butene conversions of greater than 50 mole percent with greater than 90 percent selectivity to butadiene-1,3. It has been found that little or no butane was converted to water and carbon dioxide thereby leaving essentially intact the oxygen needed for the oxidative dehydrogenation of butene to butadiene. Thus, the process of the present invention can, as an embodiment thereof, be employed as a two-stage process where in a first stage butane is non-oxidatively dehydrogenated to a butane-butene mixture over a suitable catalyst such as, for example chromia on alumina, and the butene in this mixture is oxidatively dehydrogenated to butadiene-1,3 in accordance with the present invention in a second stage.

Oxygen is fed to the reaction zone in an amount ranging from about 0.2 to about 2.5 moles of oxygen per mole of hydrocarbon to be dehydrogenated. Preferably, about 0.3 to about 1 mole of oxygen per mole of hydrocarbon is employed. In general, it has been found that as the amount of hydrocarbon being fed to the reaction zone is increased relative to the oxygen, the conversion decreases and, to a lesser degree, the selectivity increases, with the result that the yield of the desired product decreases as the oxygen to hydrocarbon ratio decreases. The oxygen can be fed to the reaction as pure oxygen, air, oxygen-enriched air, oxygen mixed with inert diluents and the like. The total amount of oxygen utilized can be introduced into the gaseous mixture entering the reaction zone or can be added in increments at different sections of the reaction zone.

The conversion of the feed stream can be increased by employing a series of reaction zones with provision to introduce additional oxygen between reaction zones. The points of introduction of the additional oxygen are established to insure that any unreacted hydrocarbon can react over an area of active catalyst after the supply of oxygen in the initial feed stream has been substantially exhausted. It is important, however, that the added oxygen be intimately admixed with the other gases and vapors in the reaction zone prior to exposure of the oxygen-enriched mixture to an area of active catalyst.

The hydrocarbon feed stream is preferably dehydrogenated in the presence of added steam; however, the use of steam is not essential and can be omitted. When employed, it is considered preferable that the reaction mixture contain a quantity of steam ranging from about 5 to about 30 moles of steam per mole of hydrocarbon to be dehydrogenated and most preferably from about 10 to about 20 moles of steam per mole of hydrocarbon. In addition to acting as a diluent in the process, the flow rate and inlet temperature of the steam can be regulated to vary the internal reaction temperature.

The dehydrogenation reaction proceeds at temperatures of at least 250° C. Preferably, the reaction is conducted at temperatures between about 300° C. and about 500° C. although higher temperatures approaching 600° C. or higher can be employed if desired. It is considered advantageous to operate at the lower end of the temperature range, for example, from about 250° C. to about 350° C., since the amount of carbon dioxide produced at these temperatures is appreciably less than at higher temperatures.

The dehydrogenation reaction can be conducted at atmospheric pressure, superatmospheric pressure or subatmospheric pressure. The total pressure of the system will normally be about or in excess of atmospheric pressure. Generally the total pressure will range from about 0.7 to about 10 p.s.i.g. Preferably the total pressure will be in the range of about 0.7 to about 5 p.s.i.g. Excellent results have been obtained at about atmospheric pressure.

The process of the present invention can be satisfactorily conducted over a wide range of flow rates. The optimum flow rate is dependent upon the reaction temperature, oxygen to hydrocarbon ratios, pressures, catalyst particle size and type of reactor employed, e.g., fluid bed or fixed bed. The gaseous hourly space velocity (GHSV) as used herein is the volume of the total hydrocarbon feed, unless otherwise indicated in reference to a specific component of the feed, in the form of vapor calculated under standard conditions of temperature and pressure (25° C. and 760 mm. Hg) passed per hour per unit volume of catalyst. Generally, the GHSV will vary between about 200 and about 6,000; however, GHSV between about 450 and about 2,000 are considered preferable.

The dehydrogenation reaction zone can be of the fixed bed or fluid bed type. Conventional reactors for the production of unsaturated hydrocarbons are satisfactory. The reactor can either be packed with particulate catalyst, per se, or the catalyst can be deposited on a carrier or support medium as hereinabove described. Other methods can similarly be employed to introduce the catalyst into the reaction zone; for example, the reaction zone itself can be coated with the catalyst or the catalyst in the form of wires, mesh, shreds, tablets and the like can be packed within the reactor.

Although not essential, the catalyst employed in the present invention can be activated by oxidizing and reducing the catalysts in the following sequence: The catalyst is oxidized by passing a stream containing about one part oxygen to about 1.5 to 4 parts inert diluent such as steam, helium, nitrogen and the like over the catalyst at temperatures between about 400° C. to 600° C., preferably about 500° C., for about 30 minutes. Thereafter, a feed stream comprised of steam, hydrocarbon and oxygen is passed over the catalyst in a gas volume ratio of about 10/1/1, respectively, although the amount of each component can be varied without adverse effect. The feed stream is passed over the catalyst at temperatures of about 300° C. to 500° C., preferably at 400° C., for about 30 minutes. Thereafter, the oxidation step is repeated as described above followed by reaction with the feed steam described above having a gas volume ratio of about 30/3/1, respectively, although again, this ratio can be varied without adverse effect. The activation sequence described hereinabove is twice repeated and finally the catalyst is once again oxidized and then reduced through use of a reducing gas such as hydrogen, carbon monoxide or hydrocarbons. Most conveniently a hydrocarbon such as butene can be employed as the reducing agent particularly in instances wherein butene is the hydrocarbon to be dehydrogenated simply by stopping the flow of oxygen. Thus, reduction of the catalyst is accomplished by passing butene or other similar hydrocarbon reducing gas in an inert diluent such as steam, helium and the like over the catalyst in a gas volume ratio of about 1/10, respectively, although the ratio can be varied without adverse effect, at temperatures between about 400° C. to 600° C., preferably at about 500° C., for about 30 minutes. Alternatively, the catalyst can be activated in situ by passing the reactant feed stream over the unactivated catalyst; however, in such case, the activation takes place over a substantial period of time. Thereafter, the active catalyst of the present invention is obtained, providing higher conversion and selectivity to the desired unsaturated hydrocarbon together with lower isomerization activity. This superior performance is maintained at temperatures as low as about 325° C. with the additional advantage that the amount of carbon dioxide produced is less at such low temperatures as low as about 325° C. with the additional advantage that the amount of carbon dioxide produced is less at such low temperatures than at the higher temperatures.

EXAMPLES

The following examples are to further illustrate the present invention and should not be considered as imposing any limitations on the scope of the invention. Unless otherwise specified, all percentages and parts are by weight.

Example 1

A lanthanum chromium ferrite catalyst was prepared in the following manner: 242.4 gm. of $Fe(NO_3)_3 \cdot 9H_2O$ and 216.5 gm. of $La(NO_3)_3 \cdot 6H_2O$ were dissolved in 1,000 ml. of distilled water in a first beaker. 1,000 ml. of distilled water were charged to a 2 gallon vessel and about 700 ml. of 7% ammonium hydroxide solution were added to said vessel to impart to the resulting aqueous solution a pH of 11.5. 500 ml. of concentrated ammonium hydroxide were admixed with 500 ml. of distilled water in a second beaker. The solutions contained in the first and second beakers were slowly added to said 2 gallon vessel, with vigorous agitation. The rate of addition of the solution in the second beaker was adjusted to maintain a pH of 11 in the vessel at all times.

60 gm. $Cr(NO_3)_3 \cdot 9H_2O$ were dissolved in 500 ml. of distilled water in a third beaker. 1,000 ml. of concentrated ammonium hydroxide were charged to a fourth beaker. 1,000 ml. of distilled water were charged to a second 2 gallon vessel to which was added ammonium hydroxide solution until a pH of 9.5 was attained. The solutions contained in said third and fourth beakers were slowly added to said second vessel, with vigorous agitation. The rate of addition of the concentrated ammonium hydroxide was adjusted to maintain a pH between 9.0 to 9.5 in said vessel at all times.

The resulting precipitates were allowed to settle overnight and the clear supernatant liquid was decanted from each. The precipitates were then thoroughly admixed and heated to about 90° C. with constant stirring, until the volume was reduced to about 1,100 ml. The combined precipitate was then filtered, dried at 120° C. and calcined for 16 hours at 650° C.

X-ray diffraction analysis of the calcined product indicated a single phase with the perovskite structure. X-ray fluorescence analysis indicated a composition corresponding to $La_{0.8}Cr_{0.2}FeO_3$.

Example 2

In all the following examples, a 4-cubic centimeter volume of 10–20 mesh catalyst particles was premixed with 4 cubic centimeters of 10–20 mesh silicon carbide particles. When charged into the reactor, this gave a catalyst bed 3″ in length. The reactor consisted of a 22″ x ¾″ stainless steel tube with a 22″ x 15 mm. Vycor liner heated by means of a 13″ Hevi-Duty tube furnace. The furnace temperature was controlled by Thermo Electronic Temperature regulators. Temperatures within the catalyst bed were determined by means of a 1/16″ concentric stainless steel thermocouple well running the length of the reactor. The void space above and below the catalyst bed was filled with coarse particles of silicon carbide. The first five inches of the reactor were used to preheat the inlet gases to reaction temperature.

The catalyst was activated by oxidizing the catalyst with a 1.5/1 mixture of helium and oxygen for 30 minutes at 500° C. at a total GHSV of 1,500 hr.$^{-1}$. Conditioning of the catalyst was continued by reacting at 400° C. with a feed stream consisting of a 10/1/1 mixture based on a gas volume of steam, butene-2 and oxygen. The reaction was carried out for 30 minutes at a total GHSV of 5,400 hr.$^{-1}$. After the reaction, the catalyst was reoxidized as described above and thereafter the reaction was continued at 400° C. with a 30/3/1 mixture based on gas volume of steam, butene-2 and oxygen. The reaction was conducted for 30 minutes at a total GHSV of 5,200 hr.$^{-1}$. The sequence as described above was repeated twice and then the catalyst was reduced at 500° C. with a 10/1 mixture of helium and butene-2 for 30 minutes at a total GHSV of 5,000 hr.$^{-1}$. Although the oxidation and reduction steps described herein have been conducted with helium as the inert diluent nitrogen, steam, or any other similar inert diluent can likewise be employed.

The results obtained with the catalyst prior to complete activation and after activation are summarized in Table 1 below:

TABLE 1

[Catalyst not pretreated before runs]

| Run No. | T(° C.) | Percent $C_4$ | $O_2/C_4$ | Stema/$C_4$ | GHSV | Conversion (mole percent) | Selectivity to butadiene (mole percent) | Yield (mole percent) |
|---|---|---|---|---|---|---|---|---|
| 1 (a) | 400 | 8.2 | 1 | 10 | 5,400 | 38 | 45 | 17 |
| 2 (a) | 400 | 8.5 | 0.33 | 10 | 5,200 | 14 | 65 | 12 |
| 3 (a) | 450 | 8.2 | 1 | 10 | 5,400 | 32 | 48 | 15 |
| 4 (a) | 450 | 8.5 | 0.33 | 10 | 5,200 | 14 | 70 | 13 |
| 5 (a) | 500 | 8.2 | 1 | 10 | 5,400 | 34 | 42 | 14 |
| 6 (a) | 500 | 8.5 | 0.33 | 10 | 5,200 | 21 | 61 | 13 |
| Reduced in butene 30 minutes at 500° C. | | | | | | | | |
| 7 (b) | 400 | 8.2 | 1 | 10 | 5,400 | 54 | 76 | 41 |
| 8 (b) | 400 | 8.5 | 0.5 | 10 | 5,200 | 33 | 84 | 28 |
| 9 (b) | 400 | 8.5 | 0.33 | 10 | 5,200 | 29 | 86 | 25 |
| Re-oxidized and reduced in butene 30 minutes at 500° C. | | | | | | | | |
| 10 (b) | 400 | 8.2 | 1 | 10 | 5,400 | 56 | 74 | 41 |
| 11 (b) | 400 | 8.5 | 0.5 | 10 | 5,200 | 37 | 84 | 31 |

(a) Catalyst oxidized between runs. (b) Catalyst not oxidized between runs.

Example 3

To illustrate the superior performance of the lanthanum chromium ferrite catalyst employed in the present invention, the oxidative dehydrogenation process as described herein was conducted with other oxides of the cations employed in the catalyst of the present invention. Table 2 shown below summarizes the results obtained employing the following catalysts: lanthanum ferrite, lanthanum chromite, iron chromite and ferric oxide:

TABLE 2

[Steam/$C_4$ ratio=10; GHSV=5,400 throughout]

| Catalyst composition | T (° C.) | Feed stream | | Conversion (mole percent) | Selectivity to butadiene (mole percent) | $CO_2$ (mole percent) | Yield (mole percent) |
| | | Percent $C_4$ | $O_2/C_4$ | | | | |
|---|---|---|---|---|---|---|---|
| $La_{0.7}CrFe_{0.3}O_3$ | 400 | (c) 7.5 | 1 | 42 | 73 | 25 | 31 |
| | 375 | (c) 7.5 | 1 | 41 | 67 | 33 | 27 |
| | 350 | (c) 7.5 | 1 | 41 | 68 | 31 | 28 |
| | 300 | (c) 7.5 | 1 | 42 | 73 | 27 | 31 |
| | 400 | (d) 7.5 | 1 | 42 | 73 | 27 | 31 |
| $La_{0.8}Cr_{0.65}Fe_{0.35}O_3$ | 400 | (c) 7.5 | 1 | 50 | 76 | 23 | 38 |
| | 375 | (c) 7.5 | 1 | 52 | 70 | 29 | 36 |
| | 350 | (c) 7.5 | 1 | 51 | 73 | 27 | 37 |
| | 300 | (c) 7.5 | 1 | 54 | 75 | 25 | 40 |
| | 400 | (d) 7.5 | 1 | 48 | 77 | 22 | 37 |
| $LaFeO_3$ | 400 | (c) 7.5 | 1 | 32 | 54 | 44 | 17 |
| | 375 | (c) 7.5 | 1 | 31 | 56 | 44 | 17 |
| $LaCrO_3$ | 400 | (c) 7.5 | 1 | 19 | 12 | 84 | 2 |
| | 375 | (c) 7.5 | 1 | 17 | 12 | 88 | 2 |
| $FeCrO_3$ | 400 | (a) 8.2 | 1 | 41 | 62 | 38 | 25 |
| | 400 | (a) 8.2 | 0.33 | 26 | 85 | 15 | 22 |
| | 400 | (b) 8.2 | 1 | 55 | 76 | 24 | 42 |
| | 400 | (b) 8.2 | 0.50 | 36 | 85 | 15 | 31 |
| | 400 | (b) 8.2 | 0.33 | 30 | 87 | 13 | 26 |
| $Fe_2O_3$ | 400 | (b) 8.2 | 1 | 34 | 55 | 45 | 19 |
| | 400 | (b) 8.2 | 0.33 | 12 | 61 | 39 | 7 |
| | 400 | (b) 8.2 | 1 | 31 | 56 | 44 | 11 |
| | 400 | (b) 8.2 | 0.50 | 19 | 57 | 43 | 17 |
| | 400 | (b) 8.2 | 0.33 | 12 | 52 | 48 | 6 |

(a) Catalyst activated in stream of He :$O_2$ : :4 :1 at 500° C. for 30 minutes prior to first run.
(b) Catalyst treated as in (a) and then reduced in stream of butene (normal feed stream without oxygen) at 500° C. for 30 minutes prior to first run.
(c) Feed was butene-1.
(d) Feed was butene-2.

What is claimed is:

1. Process for the oxidative dehydrogenation of hydrocarbons comprising contacting at least one hydrocarbon containing at least about 4 carbon atoms and oxygen with a lanthanum chromium ferrite catalyst having the empirical formula $La_aCr_bFe_cO_3$ wherein $a$ ranges from about 0.3 to about 1.25, $b$ ranges from about 0.1 to about 1 and $c$ ranges from about 0.1 to about 1.25 wherein $a+b+c=2$, at a temperature above about 250° C. thereby producing a dehydrogenated hydrocarbon having the same number of carbon atoms as said initial hydrocarbon.

2. Process as defined in claim 1 wherein the lanthanum chromium ferrite catalyst has the empirical formula $La_aCr_bFe_cO_3$ wherein $a$ ranges from about 0.7 to about 1, $b$ ranges from about 0.1 to about 1 and $c$ ranges from about 0.1 to about 1, $a+b+c=2$.

3. Process for the oxidative dehydrogenation of hydrocarbons comprising contacting at least one hydrocarbon containing at least 4 carbon atoms and from about 0.2 to about 2.5 moles of oxygen per mole of said hydrocarbon with a lanthanum chromium ferrite catalyst having the empirical formula $La_aCr_bFe_cO_3$ wherein $a$ ranges from about 0.7 to about 1, $b$ ranges from about 0.1 to about 1 and $c$ ranges from about 0.1 to about 1, $a+b+c=2$, at a temperature above about 250° C., thereby producing a dehydrogenated hydrocarbon having the same number of carbon atoms as said initial hydrocarbon.

4. Process as defined in claim 3 wherein the mixture additionally contains from about 5 to 30 moles of steam per mole of hydrocarbon.

5. Process as defined in claim 3 wherein the oxidative dehydrogenation is conducted at temperatures of from about 300° C. to about 500° C.

6. Process as defined in claim 3 wherein the lanthanum chromium ferrite catalyst has the empirical formula $La_aCr_bFe_cO_3$ wherein $a$ ranges from about 0.7 to about 1, $b$ ranges from about 0.5 to about 0.75 and $c$ ranges from about 0.45 to about 0.75, $a+b+c=2$.

7. Process for the oxidative dehydrogenation of hydrocarbons which comprises contacting at least one hydrocarbon containing at least 4 carbon atoms, from about 0.2 to about 2.5 moles of oxygen per mole of hydrocarbon and from about 5 to about 30 moles of steam per mole of hydrocarbon with a lanthanum chromium ferrite catalyst having the empirical formula $La_aCr_bFe_cO_3$ wherein $a$ ranges from about 0.7 to about 1, $b$ ranges from about 0.1 to about 1 and $c$ ranges from about 0.1 to about 1, $a+b+c=2$, at temperatures above about 250° C., thereby producing a dehydrogenated hydrocarbon having the same number of carbon atoms as said initial hydrocarbon.

8. Process as defined in claim 7 wherein the hydrocarbon is butene.

9. Process as defined in claim 7 wherein the hydrocarbon stream comprises a mixture of butene and butane.

10. Process as defined in claim 7 wherein the hydrocarbon is an isoamylene.

11. Process as defined in claim 7 wherein the mixture contains from about 0.3 to about 1 mole of oxygen per mole of hydrocarbon.

12. Process as defined in claim 7 wherein the mixture contains from about 10 to about 20 moles of steam per mole of hydrocarbon.

13. Process as defined in claim 7 wherein the oxidative dehydrogenation is conducted at temperatures of from about 300° C. to about 500° C.

14. Process as defined in claim 7 wherein the lanthanum chromium ferrite catalyst has the empirical formula $La_{0.8}Cr_{0.65}Fe_{0.55}O_3$.

15. Process for the oxidative dehydrogenation of hydrocarbons comprising:
(a) contacting a lanthanum chromium ferrite catalyst having the empirical formula $La_aCr_bFe_cO_3$ wherein $a$ ranges from about 0.3 to about 1.25, $b$ ranges from about 0.1 to about 1 and $c$ ranges from about 0.1 to about 1.25, with an oxidizing stream comprising oxygen and an inert diluent at temperatures of from about 400° C., to about 600° C. for a period of time sufficient to oxidize said catalyst;
(b) passing a feed stream of steam, hydrocarbon and oxygen over the catalyst at temperatures of from about 300° C. to about 500° C. for at least about 30 minutes;
(c) reoxidizing the catalyst as in (a);
(d) passing a feed stream over the catalyst as in (b);
(e) repeating the sequence (a) to (d) twice;
(f) reducing the catalyst by passing a reducing stream over the catalyst comprising a reducing gas and an inert diluent at a temperature of from about 400° C. to about 600° C. for at least about 30 minutes, thereby activating said catalyst; and thereafter,
(g) contacting at least one hydrocarbon containing at least 4 carbon atoms and from about 0.2 to 2.5 moles of oxygen per mole of hydrocarbon with said activated lanthanum chromium ferrite catalyst as a temperature above about 200° C. thereby producing a dehydrogenated hydrocarbon having the same number of carbon atoms as said initial hydrocarbon.

16. Process as defined in claim 15 wherein the reactant mixture additionally contains from about 5 to about 30 moles of steam per mole of hydrocarbon.

17. Process as defined in claim 15 wherein the lanthanum chromium ferrite catalyst has the empirical formula $La_aCr_bFe_cO_3$ wherein $a$ ranges from about 0.7 to about 1, $b$ ranges from about 0.1 to about 1 and $c$ ranges from about 0.1 to about 1, $a+b+c=2$.

18. Process as defined in claim 15 wherein the hydrocarbon is butene.

19. Process as defined in claim 15 wherein the hydrocarbon stream comprises a mixture of butene and butane.

20. Process as defined in claim 15 wherein the hydrocarbon is an isoamylene.

21. Process as defined in claim 15 wherein the reducing gas is butene.

22. Process for the oxidative dehydrogenation of hydrocarbons comprising:
(a) passing a feed stream of steam, hydrocarbon and oxygen over a lanthanum chromium ferrite catalyst having the empirical formula $La_aCr_bFe_cO_3$ wherein $a$ ranges from about 0.3 to about 1.25, $b$ ranges from about 0.1 to about 1 and $c$ ranges from about 0.1 to about 1.25, at a temperature above about 200° C. for a period of time sufficient to activate said catalyst; and thereafter,
(b) contacting at least one hydrocarbon containing at least 4 carbon atoms and from about 0.2 to 2.5 moles of oxygen per mole of hydrocarbon with said activated lanthanum chromium ferrite catalyst at a temperature above about 200° C. thereby producing a dehydrogenated hydrocarbon having the same number of carbon atoms as said initial hydrocarbon.

References Cited
UNITED STATES PATENTS

| | | | |
|---|---|---|---|
| 3,303,238 | 2/1967 | Christmann | 260—680 |
| 3,308,197 | 3/1967 | Bajars | 260—680 |

PAUL M. COUGHLAN, JR., *Primary Examiner.*

U.S. Cl. X.R.

252—462